Dec. 21, 1965  C. H. WICKENBERG ETAL  3,224,360
AUTOMATIC COFFEE MAKER
Filed June 14, 1961  3 Sheets-Sheet 1
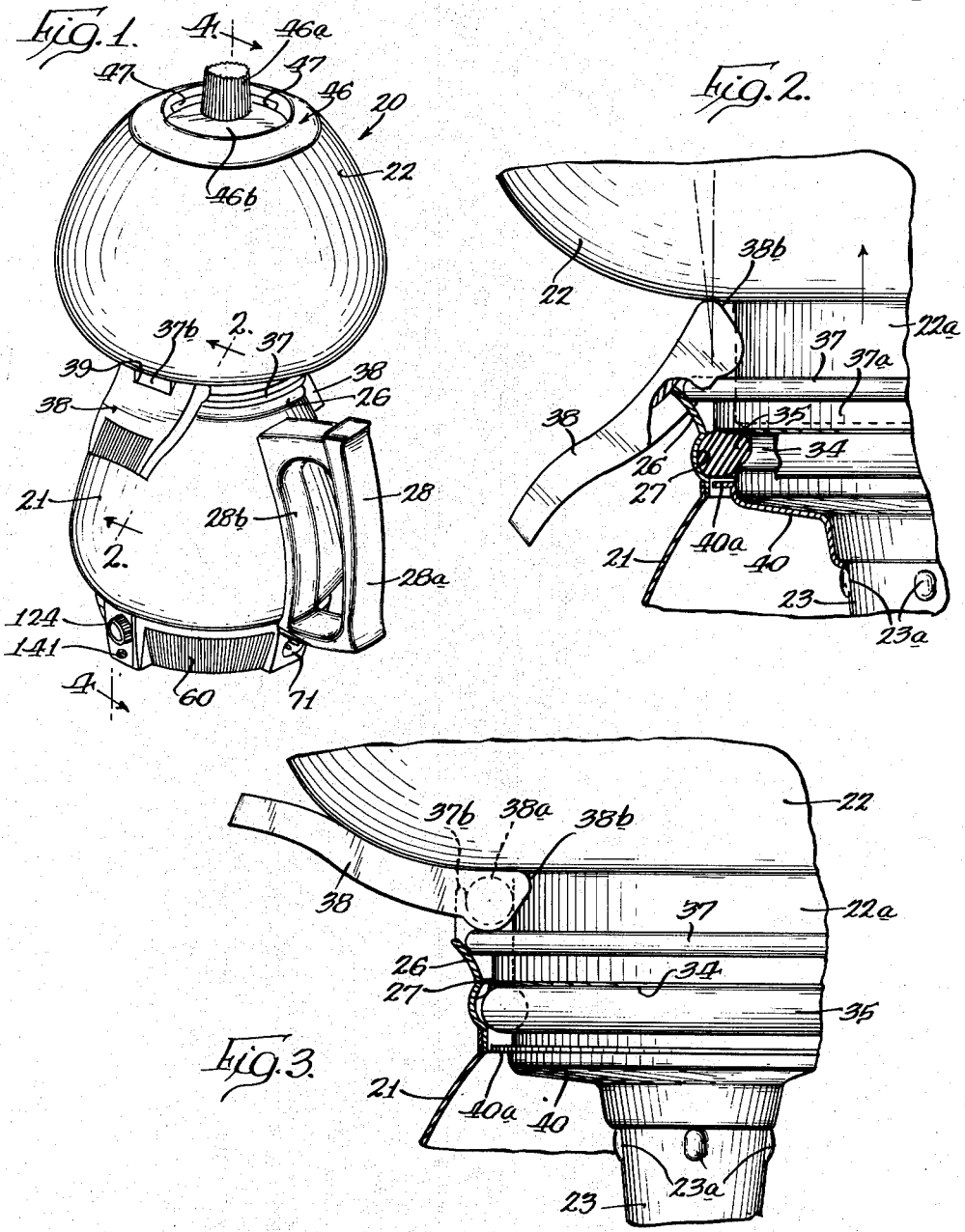
INVENTORS:
Chester H. Wickenberg
Moises B. Lorenzana
By George R. Clark
Atty Dec. 21, 1965  C. H. WICKENBERG ETAL  3,224,360
AUTOMATIC COFFEE MAKER
Filed June 14, 1961  3 Sheets-Sheet 2
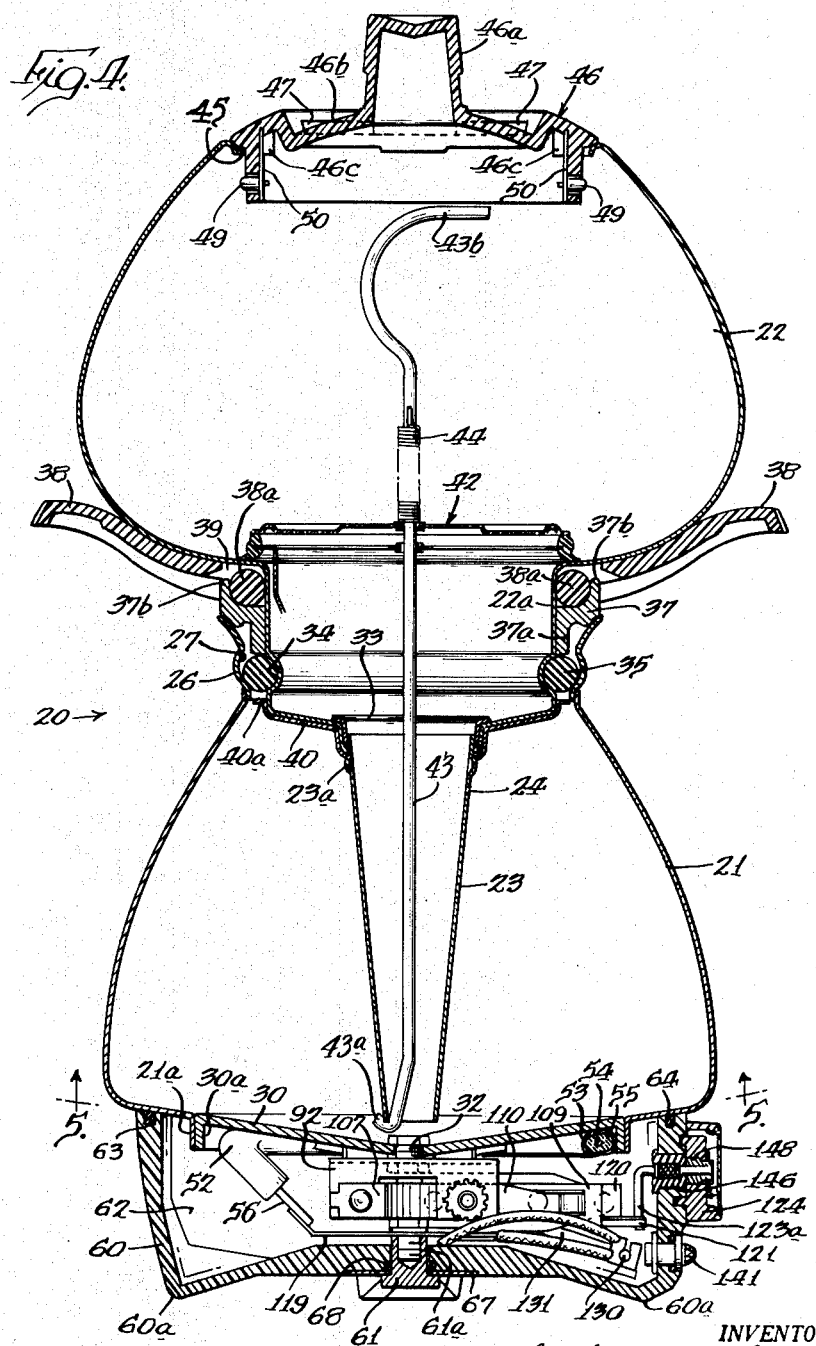
INVENTORS:
Chester H. Wickenberg
Moises B. Lorenzana
By George R. Clark
Atty Dec. 21, 1965  C. H. WICKENBERG ETAL  3,224,360
AUTOMATIC COFFEE MAKER
Filed June 14, 1961  3 Sheets-Sheet 3

INVENTORS:
Chester H. Wickenberg
Moises B. Lorenzana
By
George R. Clark
Atty

United States Patent Office 3,224,360
Patented Dec. 21, 1965

3,224,360
AUTOMATIC COFFEE MAKER
Chester H. Wickenberg, Elgin, and Moises B. Lorenzana, Glen Ellyn, Ill., assignors to Sunbeam Corporation, Chicago, Ill., a corporation of Illinois
Filed June 14, 1961, Ser. No. 117,079
8 Claims. (Cl. 99—292)

The present invention relates to automatically controlled heating devices and, more specifically, to automatic cooking devices such as beverage brewers and coffee makers of the type in which the heating means is automatically controlled during the coffee making operation.

Beverage brewers and coffee makers of the so-called vacuum type such as disclosed in Jepson Patent No. 2,312,555 have been extensively used heretofore, and there are many people who believe that this type of coffee maker is superior to all other types. In general, this vacuum type of coffee maker comprises a lower heating chamber or vessel and an upper coffee infusion chamber or vessel. Conventionally, water is placed in the lower heating chamber while the coffee grounds are placed in the upper chamber. As the water is heated in the lower chamber, water vapor pressure is created above the liquid in this charber which, when the temperature of the liquid approaches the boiling point of water, forces the water from the lower chamber into the upper chamber to infuse the coffee grounds contained therein. When the heat is removed from the lower chamber it cools so that the water vapor contained therein condenses to create a vacuum, thereby causing the hot water which has infused the coffee grounds, and now is really coffee, to be drawn back from the upper chamber through a suitable filter into the lower chamber where it is preferably maintained at a desired serving temperature which could be of the order of 160°, 180° or the like.

It will be understood that in automatic coffee makers of the type referred to above it is essential that the heat supply to the heating chamber be cut off when the water has substantially all been forced into the upper chamber. If this cutoff action occurs too soon, substantially all of the water will not have been forced to the upper chamber and the coffee will be diluted by the water remaining in the lower chamber when the coffee returns to the lower chamber. On the other hand, if the cutoff action is delayed for any appreciable period of time after all the water is forced out of the lower chamber or vessel, damage or destruction of the coffee maker may result. Actually, there have been on the market two types of automatic coffee makers embodying the so-called vacuum principle. In one type the chambers are made of metal and the heating element is built into the bottom of the lower metal chamber. An example of this type of coffee maker is disclosed and claimed in the above-mentioned Jepson Patent No. 2,312,555 assigned to the same assignee as the instant application. In this type of coffee maker it will readily be understood that when substantially all of the water has been forced from the lower chamber, a very rapid increase in the temperature of the bottom of the lower metal vessel will result and such rapid increase in the temperature of the lower vessel is utilized to actuate a thermostatically controlled switch for shutting off the heat at the proper time. The present invention is concerned with this type of coffee maker and, hence, it is unnecessary to discuss the problems of control of automatic vacuum type coffee makers where glass vessels are employed.

The automatic coffee maker of the above-mentioned Jepson patent has been a very successful device commercially and coffee makers of that type have been extensively sold throughout the world. The present invention is in the nature of an improvement on the coffee maker disclosed in the above-mentioned Jepson patent.

For proper operation of such vacuum type coffee makers it has been important to provide a good seal between the upper and lower vessels during the coffee making cycle and, as disclosed in the above-mentioned Jepson patent, a suitable tight fitting resilient sealing ring has been employed for this purpose. Although this arrangement has been very satisfactory, a problem is presented in the removal of the upper vessel upon completion of the coffee making operation. The housewife must break the tight fitting seal between the upper vessel and the lower vessel by applying a considerable amount of force to physically pull the vessels apart and when both vessels are hot, this is somewhat of a problem. It would be desirable to provide an arrangement where the vessels may be separated upon completion of the coffee making operation without the requirement of any force in breaking the seal and yet wherein a good seal is provided to maintain the vacuum type operation.

The modern trend in cleaning cooking devices has been to make it as simple as possible for the householder to clean such devices after use. It would be desirable to provide a vacuum type automatic coffee maker wherein both vessels may be completely immersed for washing without any deleterious effect on the automatic control incorporated therein.

Accordingly, it is an object of the present invention to provide a new and improved automatic coffee maker.

It is another object of the present invention to provide an improved seal between the two vessels of a vacuum type coffee maker.

It is a further object to provide a vacuum type coffee maker with improved, readily releasable locking means for locking the upper and lower vessels together.

A still further object of the present invention resides in an improved automatic coffee maker which is simple and sturdy in construction, economical to manufacture and which is capable of giving long years of satisfactory and foolproof service.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

FIG. 1 is a perspective view of an automatic coffee maker of the vacuum type employed in the present invention wherein the upper and lower vessels are shown retained or locked in sealed relationship as would be the case during a coffee making operation;

FIG. 2 is an enlarged fragmentary sectional view taken on line 2—2 of FIG. 1;

FIG. 3 is a fragmentary sectional view similar to FIG. 2, but showing the releasable locking means in the released position;

FIG. 4 is an enlarged sectional view taken on line 4—4 of FIG. 1, but showing the releasable locking arrangement in the condition of FIG. 3 and with the switch in the open position.

Figure 5:
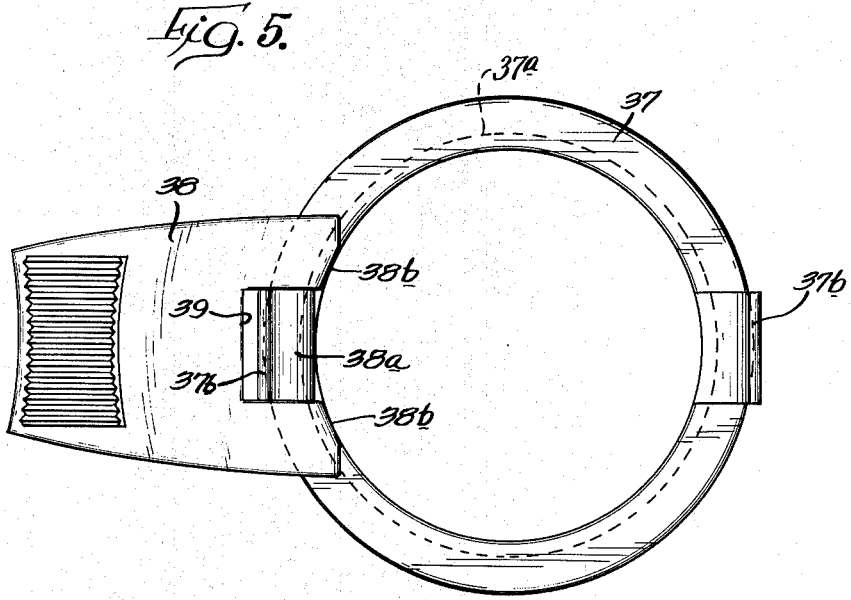
FIG. 5 is a top plan view of the seal ring and one of the upper handles associated therewith.

Briefly, the present invention is concerned with an automatic coffee maker of the vacuum type having upper and lower vessels, at least the lower one of which is formed of metal. A readily releasable O-ring seal is provided between the upper and lower vessels. This seal is provided with suitable locking means which are actuated by a pair of handles serving also as the means for handling the upper vessel or bowl. An improved temperature responsive switch of the snap acting type is provided which is simple and compact and which is manually actuated to the "On" position by means completely sealed with respect to the temperature responsive switch means. In other words, the entire control mechanism is completely sealed against the entrance of moisture so that the cooking vessel may be immersed for cleaning purposes.

Although the present invention is illustrated in the drawings as specifically applied to an automatic coffee maker of the vacuum type, it should be understood that certain features of the invention are applicable to other types of coffee makers as well as other cooking devices wherein a cooking operation may be controlled in the manner contemplated by the present invention.

Referring now to the drawings, there is illustrated an automatic coffee maker generally designated by the reference numeral 20 comprising a lower water heating chamber or vessel 21 and an upper coffee infusion chamber or vessel 22. Preferably these vessels are made of metal although at least the upper vessel 22 thereof might be made of glass, a suitable plastic or the like. The upper vessel 22 defining the coffee infusion chamber is provided with the conventional depending tube 23 which is adapted to be inserted into the lower vessel 21, as illustrated in FIGS. 1 to 4 of the drawings, to provide communication between the vessels 21 and 22. This tube 23 is preferably provided with a suitable small opening 24 (FIG. 4), such as is disclosed in the above-mentioned Jepson patent, to prevent movement of the water in vessel 21 into vessel 22 before this water is sufficiently heated.

As in the above-mentioned Jepson patent, the lower vessel 21 has an open top secured to which as by brazing or the like is a circular upright flange 26. In accordance with the present invention this upright flange is preferably provided with a circular inwardly directed annular recess or groove 27. So that the lower vessel may be used as a pouring vessel when the coffee making operation has been completed, the upright flange 26 preferably includes an extended portion, not shown, defining a pouring spout. Moreover, so that the lower vessel 21 may be readily handled by the operator when using it to pour coffee therefrom, a suitable handle 28 (FIG. 1 of the drawings) is provided, the upper end of which is suitably secured to the vessel by fastening means well understood by those skilled in the art. This handle 28 preferably is of the form sometimes referred to as a "D handle" including portions 28a and 28b, the portion 28b conforming to the vessel wall, as best shown in FIG. 1, with the lower end of the handle having a projection for interlocking relationship with another portion of the coffee maker 20. The portion 28a is, of course, the hand grip portion. The handle 28 is preferably molded from a suitable phenolic resin or the like. In an embodiment built in accordance with the present invention, the interior of the vessel portion 21 is provided with suitable indicia stamped into the vessel wall indicating the number of cups of coffee for different levels in the vessel. So that this indicia is only visible on the interior of the vessel 21, it is preferably defined in the wall portion thereof beneath the portion 28b of the handle 28.

As is best shown in FIG. 4 of the drawings, the lower portion of the side wall of the vessel 21 terminates in an annular depending flange 21a of somewhat smaller diameter than the maximum diameter of the vessel 21, and the circular space within the annular depending flange 21a is closed by a bottom 30 of somewhat conical shape with the lowest level portion thereof at the center of the bottom. The bottom 30 is likewise provided with a depending peripheral flange 30a, the outer diameter of which is substantially the same as the inner diameter of the depending flange 21a. The depending flanges 21a and 30a are united in a liquid tight seal by means of a suitable brazing or similar operation so that effectively the bottom 30 is an integral part of vessel 21.

For the purpose of securing suitable temperature responsive control means and the like to the bottom of vessel 21, there preferably is provided a center stud 32 which extends through an opening defined in the bottom 30 and which is also suitably brazed or otherwise secured to the bottom 30 in a liquid tight manner.

The upper vessel 22 with its depending tube 23 is preferably formed of metal and is shaped to provide a pleasing appearance such as shown in FIGS. 1 and 4 of the drawings. Moreover, as illustrated in FIGS. 2, 3 and 4 of the drawings, the vessel 22 includes a cylindrical depending portion 22a having a diameter somewhat smaller than the diameter of the circular flange 26 secured to the lower vessel and a lower opening of a diameter to receive the upper end of tube 23, the latter being provided with protrusions 23a for positioning purposes. The tube 23 is suitable secured to the cylindrical portion 22a as by a ferrule portion 33, best shown in FIG. 4 of the drawings. In accordance with the present invention the cylindrical portion 22a is provided with an annularly outwardly directed recess 34 for receiving an O-ring 35 so that when the vessels 21 and 22 are assembled in operative relation for a coffee making operation, the O-ring 35 may be disposed in sealing relationship with respect to the annular grooves 27 and 34. The O-ring 35 is preferably formed of a silicone rubber and of a quality that will not affect the coffee from an odor or taste standpoint.

In order to lock the lower and upper vessels 21 and 22, respectively, in sealed relationship, as shown in FIGS. 1 and 2 of the drawings, there is provided a seal ring 37, best shown in FIGS. 2, 3, 4, and 5 of the drawings, in the form of a circular annular disk of somewhat L-shaped cross section having a depending annular flange 37a and a pair of diametrically opposed upwardly extending ears 37b. The seal ring 37 has an internal diameter such as to be slidably received on the cylindrical portion 22a of the vessel 22 and a pair of locking handles 38 are provided so as to be pivotally mounted on the ears 37b as best shown in FIGS. 4 and 11 of the drawings. The locking handles 38 are preferably formed of a molded phenolic material similar to the handle 28 and preferably of the same color and include a bifurcated end with an integral pivot pin 38a extending across the bifurcations so as to define an opening 39 between the pivot pin and the portion of the handle defining the bifurcated end. The ears 37b are receivable in the opening 39. The ends of the bifurcations designated at 38b effectively define a pair of camming surfaces which, when the handle members 38 are pivoted about the axis of the pivot pin 38a from the position of FIG. 3 to the position of FIG. 2, the camming portions 38b engage the underside of the vessel 22, as clearly shown in FIG. 2 of the drawings, and cam the sealing ring 37 downwardly in a manner tending to force the O-ring out of the groove 34 and, thus, insure a good seal between the flange 26 defining the opening in lower vessel 21 and the cylindrical depending portion 22a of upper vessel 22.

It will be understood that the locking members 38 are also handles for grasping the upper vessel 22 and, since they are formed of an insulating material, the upper vessel can be lifted and moved about even when it is hot as is the case immediately following a coffee making operation. Preferably the contour of the handles or locking members 38 is such as to conform closely to the bottom portion of the upper vessel 22, as clearly shown in FIGS. 3 and 4 of the drawings, thereby providing handles for firmly supporting the vessel.

It will be appreciated that the O-ring 35 disposed in recess 34 holds the seal ring 37 and consequently the handles 38 in assembled relationship. If the O-ring is removed from the groove 34 for cleaning purposes, the seal ring 37 and handles 38 become disassembled. In order that the seal ring 37 and handles 38 remain in assembled relationship even though the O-ring 34 is removed for cleaning purposes, a suitable retainer 40 may be provided which is suitably brazed or otherwise secured beneath the cylindrical extension 22a to provide a projecting annular flange 40a of larger diameter than the seal ring 37.

As is conventional with coffee makers of the vacuum type and as is specifically disclosed in the above-mentioned Jepson patent, the upper vessel 22 is provided with a suitable filter or strainer means generally designated at 42 (FIG. 4) disposed in the bottom of upper vessel 22 so as to retain the ground coffee which is placed therein and, thus, prevent the coffee grounds from entering the depending tube 23. The particular filter arrangement generally designated at 42 forms no part of the present invention but is disclosed and claimed in a copending application of Chester H. Wickenberg and Moises B. Lorenzana, Serial No. 120,740, filed June 29, 1961 (now U.S. Patent No. 3,130,663) and assigned to the same assignee as the instant application. To hold the strainer means 42 in the position shown in FIG. 4 of the drawings, there preferably is provided a filter rod 43 and a coiled spring 44, the filter rod 43 having a hook portion 43a at the lower end for engaging the lower end of the depending tube 23. The coiled spring 44 then tends to bias the filter means 42 into sealing engagement with the bottom of vessel 22 above the cylindrical depending portion 22a. The upper end of the filter rod 43 is provided with a portion 43b which may be engaged by the operator in inserting and removing the filter as will readily be understood by those skilled in the art.

The upper vessel 22 is preferably provided with a top opening 45 of a diameter corresponding to the circular opening at the top of lower vessel 21 so that a common cover 46 may be employed. The cover 46 may be formed of a molded plastic with a suitable manually engageable knob portion 46a integrally formed therewith. Preferably, also, the cover 46 is provided with a depressed central annular portion 46b surrounding the knob 46a and suitable slots 47 are provided so that when the cover 46 is associated with the lower vessel 21, coffee may be poured through the slots in the cover 46. In order that the cover 46 may be removably latched to the lower vessel 21, it is provided with a pair of diametrically opposed latch buttons 49 which are pressed by suitable leaf springs 50 into a latching position as shown in FIG. 4 of the drawings. Preferably the latch buttons 49 are receivable within the groove 27 in lower vessel 21 to removably latch the cover into position. The latch springs 50 are preferably supported by suitable abutments 46c integrally formed with the cover 46 and effectively defining a groovelike recess for receiving the upper ends of these springs. Moreover, the latching buttons 49 which have projections extending through suitable openings in the lower ends of the leaf springs 50 prevent the leaf springs from moving out of engagement with the abutments 46c.

From the above description it will be apparent that an improved sealing arrangement has been provided between the lower vessel 21 and the upper vessel 22. This sealing arrangement is designed so that the cylindrical extension 22a with the O-ring 35 mounted thereon can readily be inserted in the circular opening in the lower vessel 21. Upon actuation of the locking levers 38 from the position shown in FIG. 3 to the position shown in FIG. 2, the O-ring 35 is expanded so as to make good sealing engagement between the nested portions of the vessels 21 and 22. When it is desired to remove the upper vessel 22 upon completion of a coffee making operation, the user need merely release the locking levers 38 moving them from the position shown in FIGS. 1 and 2 to the position shown in FIGS. 3 and 4, whereupon the upper vessel may be removed by merely lifting it upwardly with no force other than that to lift the weight of the upper vessel.

For the purpose of heating liquid contained in the lower vessel 21, there is provided a main heating element 52 which is in good heat exchange relationship with the underside of bottom 30 as best shown in FIG. 4 of the drawings. As illustrated, the heating element 52 is preferably of the well-known sheathed form comprising an outer metal sheath 53 within which is disposed a resistance element 54 preferably disposed in the form of a spiral coil and spaced and supported within the sheath 53 by suitable electrical insulating material 55 which also provides a good heat conductor. The heating element 52 is arranged in a circular configuration and disposed closely adjacent the depending flange 30a of the bottom 30. The ends of the resistance element 54 of sheathed heating element 52 are connected to suitable terminals, only the terminal 56 being illustrated, extending out of the sheath 53. Preferably these terminals are closely adjacent to each other and extend into a different plane from the main portion of the heating element 52. Only a single turn of the sheathed heating element 52 is necessary since the bottom 30 is preferably formed of a material having a very high heat conductivity, such as sheet copper or the like. Moreover, the heating element 52 is brazed to the bottom 30 so as effectively to comprise an integral part of such bottom.

Preferably and as disclosed in the above-mentioned Jepson patent, the automatic coffee maker 20 is provided with an insulating base 60 formed of a suitable phenolic material or the like which is adapted to be secured to the bottom of vessel 21 by the center stud 32 and specifically by means of a nut 61 engageable with the threaded end of the stud 32. The base 60 effectively defines a control chamber 62 therein beneath the lower vessel 21. Essentially the base 60 is a saucer shaped member having a circular rim portion with an annular peripheral recess 63 defined therein for receiving a sealing gasket 64 for providing a moisture tight seal between the rim of the base 60 and the bottom of vessel 21 engaged thereby as clearly shown in FIG. 4 of the drawings. An important aspect of the automatic coffee maker resides in a completely sealed arrangement whereby the lower vessel 21 may be immersed in liquid for cleaning purposes. The details of this construction are disclosed and claimed in a copending divisional application, Serial No. 368,159, filed May 18, 1964, which disclosure is incorporated by reference herein. Some of the reference numerals appended to FIG. 4 and not referred to herein are discussed in said divisional application. The gasket 64 thus insures that no liquid can enter the chamber 62 at the junction between the base 60 and the vessel 21. It will be appreciated that the center stud nut 61 engaging the center stud 32 applies the necessary compressive force to the gasket 64.

As illustrated in FIG. 4 of the drawings, the base 60 is provided with a central opening and the bottom of the base concentric with the opening is provided with a first counter sunk portion for receiving a spring washer 67 and a slightly deeper counter sunk portion for receiving an O-ring 68, the latter being necessary to seal the central opening 66 against the entrance of moisture. The center stud nut 61 is illustrated as having a shank portion 61a extending into the opening 66 for threadedly engaging the stud 32, and when the stud nut 61 is in the position indicated in FIG. 4 of the drawings clamped against a stop nut 69, a seal is provided not only at the top periphery of the base 60 but also at the opening 66. It will be understood that spring washer 67 in effect provides spring loading means for maintaining a predetermined pressure on the sealing means 64 and 68. In order that the portion of the center stud nut 61 projecting below the base 60 does not interfere with supporting the coffee maker 20 from a suitable surface, the base 60 is preferably provided with a plurality of lug portions 60a at uniformly spaced positions at the periphery thereof effectively defining legs.

It is common practice with electrical appliances today to connect them to a source of electrical power through a power cord generally comprising a female type connector adapted to make electrical connection with a male type bayonet or so-called pin contacts. To this end the base 60 is provided with an outwardly opening recess 71 disposed immediately beneath handle 28 and having wall portions integrally molded with the base 60.

In accordance with the present invention the main heating element 52 is utilized only during the coffee brewing operation to heat the bottom 30 of the lower vessel 21 to a temperature in excess of 200° F. until all the water in the lower vessel is forced into the upper vessel 22. When heating by the main heating element 52 is terminated, for the purpose of keeping the brewed coffee in the lower vessel 21 at a desirable serving temperature of 160° to 180° F., there is provided a secondary heating element, not shown.

The assembled secondary heater is held against the bottom 30 of the vessel 21 in good heat exchange relationship. For the purpose of holding this heater in engagement with the vessel bottom 30, there is provided a combined switch mounting bracket and secondary heater clamping plate generally designated as 92. This plate 92 has an opening for receiving the stud 32 and is clamped into position by a nut threadedly engaging the stud 32.

So that the switch of the control means for heating element 52 may be manually closed when desired, there is provided a switch control knob 124 best shown in FIGS. 1 and 4 of the drawings.

It is generally desirable to know when the brewing operation has been completed and to this end there is preferably provided a suitable indicating light designated at 130 supported by a lamp bracket 131. The lamp 130 is preferably a neon bulb and is connected across the terminals of the main heating element 52.

So that this light may be visible outside chamber 62, the base 60, as best shown in FIG. 4 of the drawings, is provided with an opening for receiving a suitable lens 141.

It will be appreciated that the knob 124 must be outside the chamber 62, whereas the switch which it controls is disposed within such chamber. So that this can be accomplished while maintaining the chamber 62 sealed against the entrance of moisture, suitable means described in the divisional application are provided.

From the above description it will be appreciated that there has been provided a simple automatic coffee maker 20 which is inexpensive to manufacture and which is foolproof in operation. Furthermore, by the improved seal between the vessels, proper operation is assured and the housewife can separate the vessels at the end of the brewing period without any problem whatsoever. When the coffee making operation is completed, the main heating element is turned off and the secondary heating element keeps the coffee in the lower vessel at a desirable serving temperature. The control switch is only actuated twice during a coffee making operation, once when the switch is closed by manual actuation of the knob 124 and finally at the termination of the brewing operation. Furthermore, the lower vessel 21 as well as the upper vessel 22 may be completely immersed in liquid for cleaning purposes without any possible damage to any of the electrical circuits.

While there has been shown and described a particular embodiment of the present invention, it will be understood that various changes and modifications of the invention will occur to those skilled in the art. It is aimed in the appended claims to cover all such changes and modifications as fall within the true spirit and scope of the invention.

What is claimed as new and desired to be secured by Letters Patent of the United States is:

1. In a vacuum type coffee maker the combination of, a lower vessel having an annular upstanding flange defining the opening in the top of said vessel, an inwardly directed first annular recess defined in said flange, an upper vessel having a cylindrical depending portion receivable in said opening, an outwardly directed second annular recess in said cylindrical depending portion generally disposed opposite said first recess when said vessel is disposed with said depending portion in said opening, a resilient sealing ring disposed in said second recess, said cylindrical portion with said sealing ring disposed in said recess being inserted into said opening and removable therefrom, and means on said upper vessel for camming said sealing ring to tend to move it out of said second recess and into sealing engagement between said flange and said cylindrical portion thereby to insure a good seal between said vessels.

2. A vacuum type coffee maker comprising an open top lower vessel having means defining a circular opening in the top thereof, an upper vessel having a cylindrical depending portion readily receivable in said opening, an annular groove defined in the periphery of said depending portion, an annular resilient sealing member of circular cross section disposed in said groove, said cylindrical portion with said sealing member disposed in said groove being inserted into said opening and removable therefrom, and means on said upper vessel for camming said sealing member to tend to move it out of said groove and into sealing engagement with both said first-mentioned means and said cylindrical portion thereby to insure a good seal between said vessels.

3. A vacuum type coffee maker comprising an open top lower vessel having means defining a circular opening in the top thereof, an upper vessel having a cylindrical depending portion readily receivable in said opening, an annular groove defined in the periphery of said depending portion, a resilient O-ring type sealing member surrounding said cylindrical depending portion and disposed in said groove, said cylindrical portion with said sealing member disposed in said groove being inserted into said opening and removable therefrom, a rigid seal ring slidable along said depending portion, manually actuatable means on said upper vessel for moving said seal ring axially along said depending portion to cam said O-ring type sealing member to tend to move it out of said groove into sealing engagement with both said first-mentioned means and said cylindrical portion thereby to insure a good seal between said vessels.

4. The coffee maker of claim 3 wherein said manually actuatable means comprises a pair of insulating locking members pivotally related to said seal ring.

5. The coffee maker of claim 4 wherein said locking members comprise the handles for said upper vessel.

6. In a vacuum type coffee maker the combination of, a lower vessel having an annular upstanding flange defining an opening in the top of said vessel, an inwardly directed first annular recess defined in said flange, an upper vessel having a cylindrical depending portion receivable in said opening, an outwardly directed second annular recess in said cylindrical depending portion generally disposed opposite said first recess when said vessel is disposed with said depending portion in said opening, an O-ring of resilient material disposed in said second recess, said cylindrical portion with said O-ring disposed in said recess being inserted into said opening and removable therefrom, means on said upper vessel for camming said O-ring out of said second recess and into sealing engagement between said flange and said cylindrical portion thereby to insure a good seal between said vessels comprising a rigid seal ring surrounding said cylindrical portion above said O-ring and movable axially along said cylindrical portion, a pair of ears projecting from said seal ring, and locking means pivoted to said ears including cam portions engageable with the bottom of said upper vessel for moving said seal ring in a direction to tend to force said O-ring out of said second recess.

7. The coffee maker of claim 6 wherein said locking means comprise insulating handles having portions shaped to conform to the bottom of said upper vessel when in the position where said cam portions are ineffective.

8. The coffee maker of claim 6 wherein means are provided for preventing said seal ring from being removed from said cylindrical portion.

References Cited by the Examiner

UNITED STATES PATENTS

| 2,470,323 | 5/1949 | Smith | 99—292 |
| 2,504,728 | 4/1950 | Purpura | 219—43 |
| 2,687,469 | 8/1954 | Koci | 219—43 |
| 2,885,949 | 5/1959 | Curtis | 99—292 |

FOREIGN PATENTS

| 1,164,369 | 5/1958 | France. |
| 561,228 | 4/1957 | Italy. |
| 66,589 | 8/1943 | Norway. |

WALTER A. SCHEEL, *Primary Examiner.*

J. D. BEIN, LEONARD W. VARNER, JR., *Examiners.*